Feb. 1, 1927.
J. H. BURNS
1,616,026
RESILIENT TIRE
Filed Aug. 29, 1924
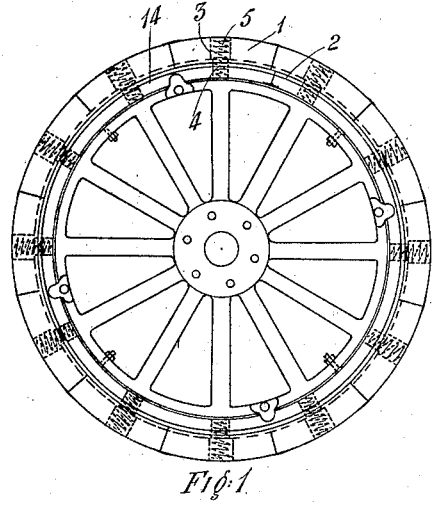
Fig.1.
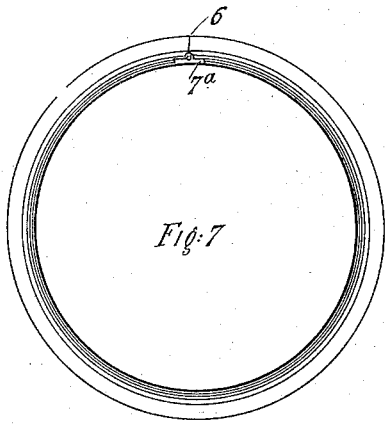
Fig.7
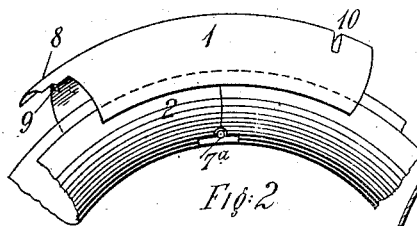
Fig.2.
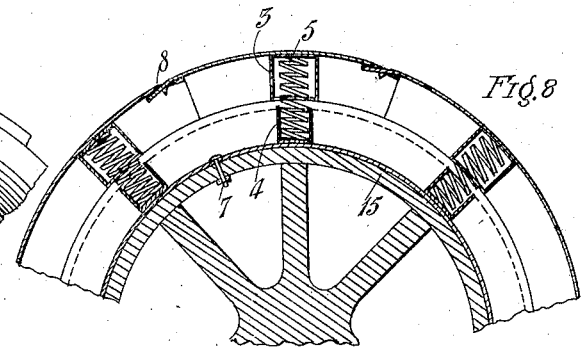
Fig.8.
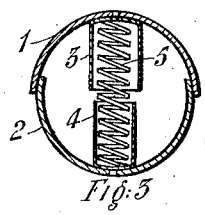
Fig.3.
Fig.9.
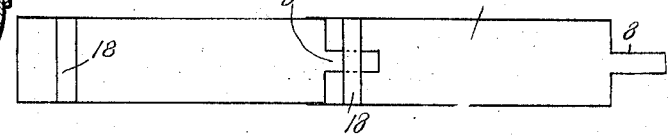
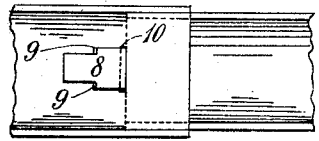
Fig.4.
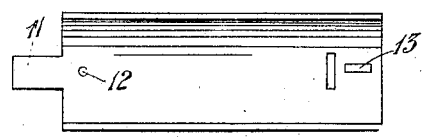
Fig.5.
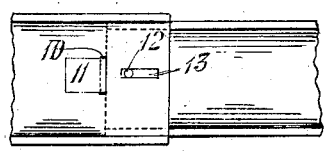
Fig.6.
Inventor
J. H. Burns
By Marks & Clerk Patented Feb. 1, 1927.

1,616,026

UNITED STATES PATENT OFFICE.

JOHN HENRY BURNS, OF BRISBANE, QUEENSLAND, AUSTRALIA.

RESILIENT TIRE.

Application filed August 29, 1924, Serial No. 734,947, and in Australia July 10, 1924.

This invention relates to improvements in resilient tires for motor vehicle wheels and is designed with the object of providing a resilient and practically unpuncturable tire and one that will resist wear and tear for a considerable time.

This invention consists of two metal rings of half circular section, preferably of spring steel, the outer one of which (hereinafter referred to as the outer member) is constructed in sections and overlaps the inner one (hereinafter referred to as the inner member) which fits on to the rim of the motor wheel or which may be fastened to a detachable rim according to the type of motor wheel used; in the former case the inner member is bolted to the wheel rim and in the latter case bolted to a detachable rim, said rim fitted to the wheel rim and fastened thereto by dogs and bolts in the usual manner.

Each section of the outer member is provided with a tongue at one end and a slot at the other, the tongue of one section fitting into the slot of the opposing section; this permits of free movement of the sections; the tongues are provided with ears at their shoulders (with the exception of one section hereinafter referred to) which prevents any possibility of their pulling out of the slot.

In fitting the last section to complete the circle when fitting the outer member on to the inner member, it is not practicable to form ears on the shoulders of the tongue, in lieu thereof I fit a set screw or pin on the inside of the section behind the tongue which projects through a longitudinal slot made in the adjacent section behind the cross slot of equal length to the length of movement.

In the centre of each section of the outer member is fastened by any suitable means a short cylinder which telescopes over a similar cylinder of smaller diameter fastened to the inner member and in these cylinders is placed a spiral compression spring.

The inner member is split in one place of its circumference to permit of the same being sprung on to the motor wheel rim when detachable rim is not used.

To fully describe the invention reference is now made to the accompanying drawings in which:—

Fig. 1 is an elevation of a wheel fitted with the tire showing the inner member fastened to a detachable rim and the internal cylinders and springs shown in dotted lines.

Fig. 2. Perspective view to enlarged scale of one section of the outer member and a broken length of the inner member showing the join.

Fig. 3. Cross section to enlarged scale of the outer and inner members showing the cylinders with spiral springs therein in section.

Fig. 4. Inside plan view to enlarged scale of end portions of two sections of the outer member fitted together.

Fig. 5. Inside plan view of one section when alternative method of fitting the sections together is employed.

Fig. 6. Inside plan view showing end portions of two sections fitted together by the alternative method.

Fig. 7. Elevation to reduced scale of inner member showing join.

Fig. 8. Sectional elevation to enlarged scale of the tire showing inner member fastened to a double flanged wheel rim and cylinders in section with springs therein.

Fig. 9. Plan of two sections of modified construction of outer member to enlarged scale.

The reference numerals indicate like parts in all figures.

1 is the outer member which overlaps the inner member 2, in the centre of the length of each section of the outer member is suitably attached thereto a short cylinder 3 which telescopes over a short cylinder 4 attached to the inner member in which is inserted a spiral spring 5.

The inner member is jointed at 6 and bolted to a detachable rim 14 or to a flanged rim 15 by a coupling plate 7ª and bolt 7 and by additional bolts in its circumference if thought necessary.

8 is a shouldered tongue provided with ears 9, said ears preventing same from drawing out of the slot 10. 11 is a straight sided tongue, used when employing the alternative method of fitting the sections together; 12 is a pin or set screw fitted to the inside of a section behind the tongue; this pin projects inwardly through a longitudinal slot 13 made in the adjacent section behind the cross slot.

18 is a band attached to the outside of the sections of the outer member under which are inserted the tongues of the sections.

In use as the tire travels over the ground the internal springs are depressed and the tongues of the sections move forwards and backwards in their slots providing for uniform resiliency.

What I claim as my invention, and desire 5 to secure by Letters Patent is:—

In improvements in resilient tires for motor vehicle wheels, the combination of an outer member consisting of a metal ring of half circular section constructed in sections shoul-10 dered at one end forming a tongue which, in certain of said sections, is provided with ears, said sections provided at their other ends with slots into which fit the tongues of the adjacent sections, an inner member consisting of a split metal ring of half circular section, a series of short cylinders attached to the inside of the inner member adapted to telescope respectively into a series of short cylinders attached to the inside of the outer member, spiral springs fixed inside the said cylinders and said metal rings adapted to fit round the rim of a motor vehicle wheel as herein described.

In testimony whereof I have signed my name to this specification.

JOHN HENRY BURNS.